US012721419B2

(12) United States Patent
Charraud

(10) Patent No.: US 12,721,419 B2
(45) Date of Patent: Sep. 1, 2026

(54) ENSURING ACCURATE COLOR REPRODUCTION BETWEEN CUSTOM MIXED PRODUCTS AND AUGMENTED REALITY PRESENTATIONS

(71) Applicant: L'Oreal, Paris (FR)

(72) Inventor: Grégoire Charraud, Jersey City, NJ (US)

(73) Assignee: L'Oreal, Paris (FR)

( * ) Notice: Subject to any disclaimer, the term of this patent is extended or adjusted under 35 U.S.C. 154(b) by 268 days.

(21) Appl. No.: 18/712,976

(22) PCT Filed: Nov. 29, 2022

(86) PCT No.: PCT/US2022/051289
§ 371 (c)(1),
(2) Date: May 23, 2024

(87) PCT Pub. No.: WO2023/101987
PCT Pub. Date: Jun. 8, 2023

(65) Prior Publication Data

US 2025/0017355 A1 Jan. 16, 2025

(30) Foreign Application Priority Data

Nov. 30, 2021 (FR) ...................................... 2112739

(51) Int. Cl.
*A45D 44/00* (2006.01)
*G06F 3/01* (2006.01)

(52) U.S. Cl.
CPC ............ *A45D 44/005* (2013.01); *G06F 3/011* (2013.01); *A45D 2044/007* (2013.01)

(58) Field of Classification Search
CPC . A45D 44/005; A45D 2044/007; G06F 3/011; B44D 3/003
See application file for complete search history.

(56) References Cited

U.S. PATENT DOCUMENTS 8,933,994 B2 * 1/2015 Gross .................... G06V 40/10 348/47
9,858,685 B2 * 1/2018 Nichol .................. H04N 7/185
(Continued)

FOREIGN PATENT DOCUMENTS

FR 3 106 733 A1 8/2021

OTHER PUBLICATIONS

International Search Report and Written Opinion mailed on Mar. 15, 2023, issued in the corresponding International Application No. PCT/US2022/051289 filed on Nov. 29, 2022, 12 pages.

*Primary Examiner* — Timothy A Musselman
(74) *Attorney, Agent, or Firm* — Christensen O'Connor Johnson Kindness PLLC

(57) ABSTRACT

In some embodiments, a computer-implemented method of accurately reproducing a color of a mixed product is provided. A color management computing system receives one or more inputs indicative of a target color. The color management computing system transmits a command to a product mixing device to dispense color component products to be mixed to create a mixed product of a first color. The color management computing system obtains an image that includes the mixed product. The color management computing system updates a display color correction profile based on a comparison of a captured color of the mixed product in the image to the target color. The color management computing system presents one or more instances on a display device of an adjusted target color indicative of the updated display color correction profile, in response to receiving a subsequent request to change the target color.

20 Claims, 8 Drawing Sheets

(56) References Cited

U.S. PATENT DOCUMENTS

| | | | | |
|---|---|---|---|---|
| 10,719,729 | B2 * | 7/2020 | Kuo | G06Q 30/0282 |
| 11,707,718 | B2 * | 7/2023 | Brandon | A45D 44/005 |
| | | | | 424/61 |
| 2013/0058543 | A1 * | 3/2013 | Thomas | G06T 7/90 |
| | | | | 382/116 |
| 2016/0127706 | A1 | 5/2016 | Kato | |
| 2020/0020011 | A1 * | 1/2020 | Harvill | G06Q 30/0621 |

* cited by examiner

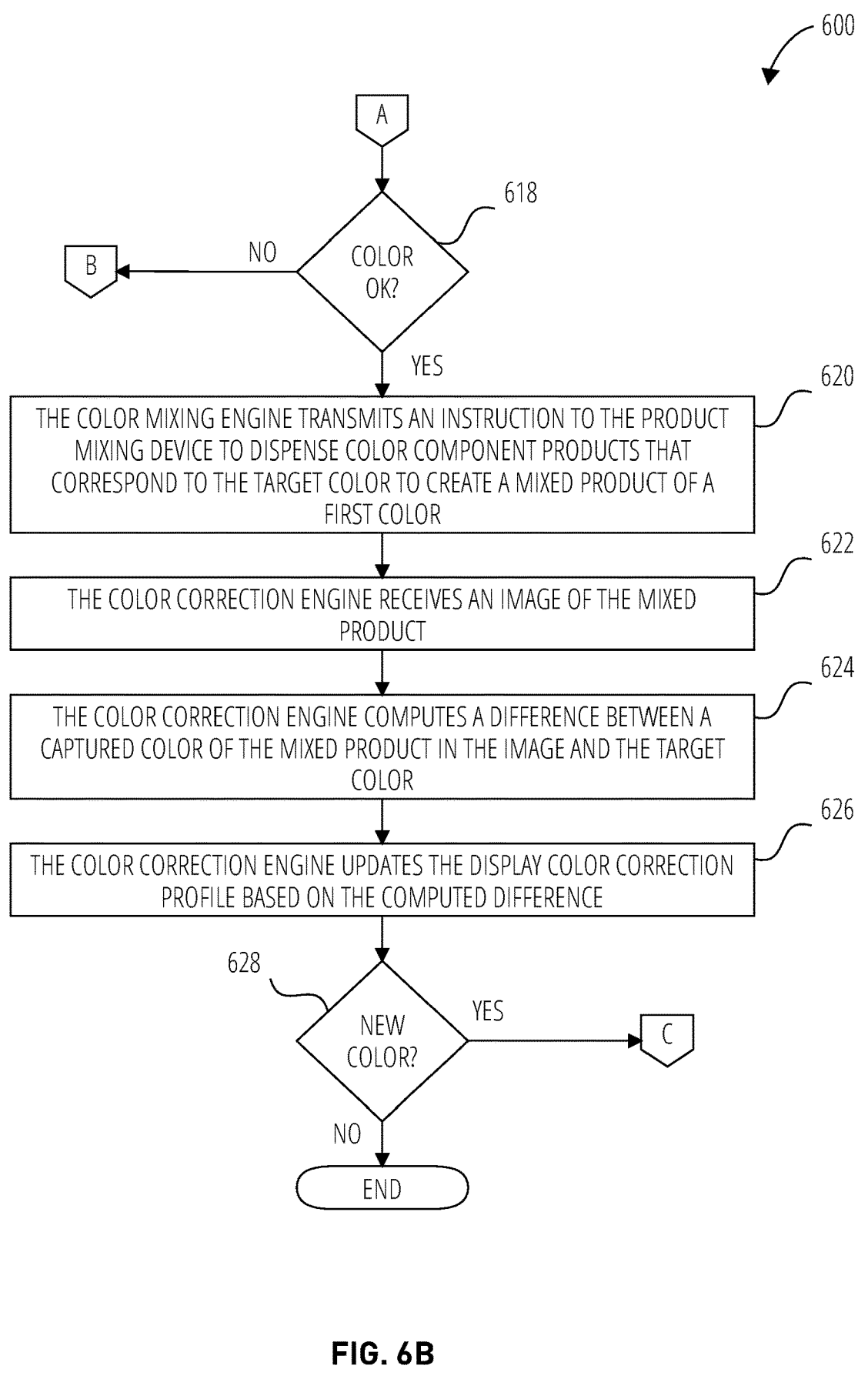

600

A

618 COLOR OK?

NO → B

YES

620 THE COLOR MIXING ENGINE TRANSMITS AN INSTRUCTION TO THE PRODUCT MIXING DEVICE TO DISPENSE COLOR COMPONENT PRODUCTS THAT CORRESPOND TO THE TARGET COLOR TO CREATE A MIXED PRODUCT OF A FIRST COLOR

622 THE COLOR CORRECTION ENGINE RECEIVES AN IMAGE OF THE MIXED PRODUCT

624 THE COLOR CORRECTION ENGINE COMPUTES A DIFFERENCE BETWEEN A CAPTURED COLOR OF THE MIXED PRODUCT IN THE IMAGE AND THE TARGET COLOR

626 THE COLOR CORRECTION ENGINE UPDATES THE DISPLAY COLOR CORRECTION PROFILE BASED ON THE COMPUTED DIFFERENCE

628 NEW COLOR?

YES → C

NO

END

FIG. 6B

ENSURING ACCURATE COLOR REPRODUCTION BETWEEN CUSTOM MIXED PRODUCTS AND AUGMENTED REALITY PRESENTATIONS

CROSS REFERENCE TO RELATED APPLICATIONS

This application is a National Stage of International Application No. PCT/US2022/051289, filed Nov. 29, 2022 which claims priority to French Patent Application No. 2112739, filed Nov. 30, 2021. The entire disclosures of the priority applications are hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of accurately reproducing a color of a mixed product is provided. A color management computing system receives one or more inputs indicative of a target color. The color management computing system transmits a command to a product mixing device to dispense color component products to be mixed to create a mixed product of a first color. The color management computing system obtains an image that includes the mixed product. The color management computing system updates a display color correction profile based on a comparison of a captured color of the mixed product in the image to the target color. The color management computing system presents one or more instances on a display device of an adjusted target color indicative of the updated display color correction profile, in response to receiving a subsequent request to change the target color.

In some embodiments, a non-transitory computer-readable storage medium having instructions stored thereon is provided. The instructions, in response to execution by one or more processors of a computing system, cause the computing system to perform actions including receiving one or more inputs indicative of a target color; transmitting a command to a product mixing device to dispense color component products to be mixed to create a mixed product of a first color; obtaining an image that includes the mixed product; updating a display color correction profile based on a comparison of a captured color of the mixed product in the image to the target color; and presenting one or more instances on a display device of an adjusted target color indicative of the updated display color correction profile, in response to receiving a subsequent request to change the target color.

In some embodiments, a system is provided that includes a product mixing device, a camera, and a color management computing system. The color management computing system is communicatively coupled to the product mixing device and the camera. The color management computing system includes circuitry for receiving one or more inputs indicative of a target color; circuitry for transmitting a command to the product mixing device to dispense color component products to be mixed to create a mixed product of a first color; circuitry for obtaining, from the camera, an image that includes the mixed product; circuitry for updating a display color correction profile based on a comparison of a captured color of the mixed product in the image to the target color; and circuitry for presenting one or more instances on a display device of an adjusted target color indicative of the updated display color correction profile, in response to receiving a subsequent request to change the target color.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6A-FIG. 6B are a flowchart that illustrates a non-limiting example embodiment of a method of providing an accurate color reproduction for custom mixed products according to various aspects of the present disclosure.

DETAILED DESCRIPTION

Recent advances in technology have allowed for the increased availability of personalized products such as cosmetics. For example, devices and systems have been made available that allow consumers to create cosmetics with custom colors on demand, thus providing the consumers with a large spectrum of available colors. Since the consumers are not provided with physical samples of available colors before they are mixed, it is helpful to provide consumers with augmented reality virtual try-on interfaces so that the consumer can virtually sample available colors before mixing the custom colors. This can become particularly helpful in situations where a product mixing device dispenses a single use of a custom color at a time to reduce waste, and in situations where the components of custom colors are particularly rare or expensive.

In creating a virtual try-on interface, certain technical problems can arise that reduce the effectiveness of the experience. For example, differences in cameras, display devices, and other elements of the virtual try-on system can cause differences between a rendering of a custom color within the virtual try-on interface and the actual color of the mixed product as produced. If there are significant differences between the rendering and the actual color of the mixed product, the virtual try-on interface does not serve its purpose of allowing the consumer to sample the custom color before mixing. Accordingly, what is desired are techniques that allow accurate color renderings for sampling of custom colors.

Figure 1:
FIG. 1 is a schematic illustration of a non-limiting example embodiment of a system for generating virtual try-on interfaces for custom color products according to various aspects of the present disclosure.
Figure 1:
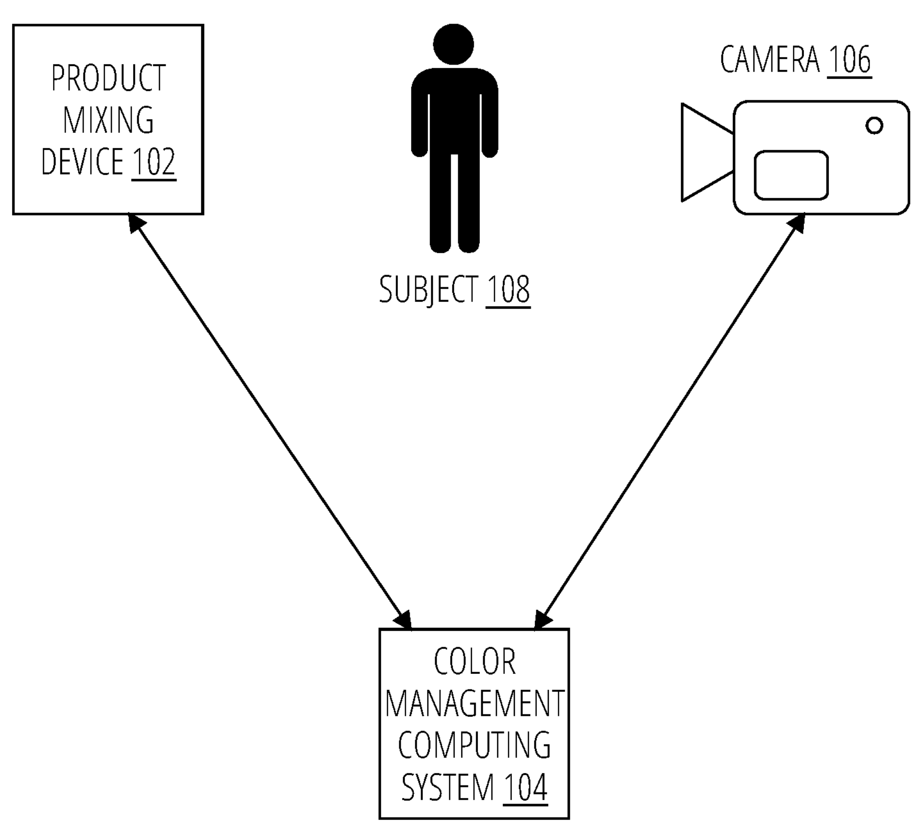

FIG. 1 is a schematic illustration of a non-limiting example embodiment of a system for generating virtual try-on interfaces for custom color products according to various aspects of the present disclosure.

As illustrated, the system 100 includes a product mixing device 102, a camera 106, and a color management computing system 104. The product mixing device 102 and the camera 106 are communicatively coupled to the color management computing system 104 using any suitable communication technology or combinations of communications technologies, including but not limited to wireless techniques (including but not limited to Bluetooth, Wi-Fi, WiMAX, 2G, 3G, 4G, and 5G) and/or wired techniques (including but not limited to USB, FireWire, and Ethernet).

The product mixing device 102 is a device that is configured to provide predetermined amounts of color component products that can be mixed in order to produce a mixed product having a specific color. In some embodiments, the mixed product that is generated is a makeup product that can be applied to the skin of the subject 108 in order to change the appearance of the subject 108. The description herein primarily relates to lipstick for ease of discussion, but this should not be seen as limiting: the system 100 may be used with any mixed product capable of being generated using the product mixing device 102, including but not limited to lipstick, foundation, concealer, eye shadow, eye liner, and mascara.

The color management computing system 104 is used to select colors, to provide augmented reality presentations that include the colors, and to instruct the product mixing device 102 to dispense the predetermined amounts of color component products that correspond to target colors. In an embodiment, the color management computing system 104 is used to select colors including hue, tint, tone, and shade, and the like, to provide augmented reality presentations that include the colors, and to instruct the product mixing device 102 to dispense the predetermined amounts of color component products that correspond to target colors. The camera 106 is used to capture images of a subject 108 to be used within the augmented reality presentations, and also to capture images of the mixed product in order to improve color reproductions as described in further detail below.

In an embodiment, the subject 108 uses a color selection component presented by the color management computing system 104 to select a color for a product. In an embodiment, the color management computing system 104 then uses images captured by the camera 106 to generate an augmented reality "virtual try-on" interface that illustrates to the subject 108 what the color should look like after the mixed product is applied. If the subject 108 agrees with the predicted color, the subject 108 accepts the color using the color management computing system 104, and the color management computing system 104 transmits an instruction to the product mixing device 102 to dispense the components of the color for creating the mixed product. The subject 108 then uses the camera 106 to capture the mixed product, either after having been mixed but before being applied, or after having been applied. The color management computing system 104 compares a color of the mixed product as depicted in the image to the target color, and updates a display color correction profile to ensure that future colors presented by the color management computing system 104 are presented accurately.

While the components of the system 100 are illustrated in FIG. 1 as three separate components, in some embodiments, two or more of these separate components (or portions thereof) may be combined into a single device. For example, in some embodiments, the camera 106 may be incorporated into a device of the color management computing system 104, such as a smartphone computing device or a tablet computing device. As another example, in some embodiments, some aspects of the color management computing system 104 may be incorporated into the product mixing device 102.

Figure 2A:
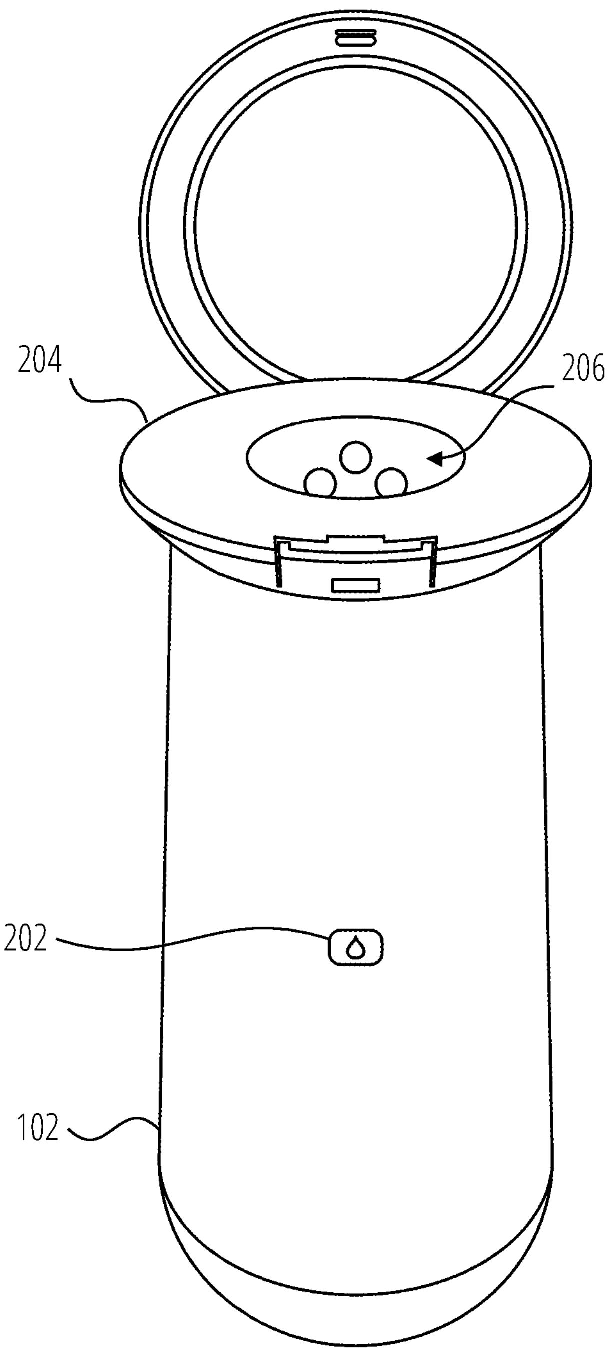
FIG. 2A and FIG. 2B illustrate a non-limiting example embodiment of a product mixing device according to various aspects of the present disclosure.
Figure 2B:
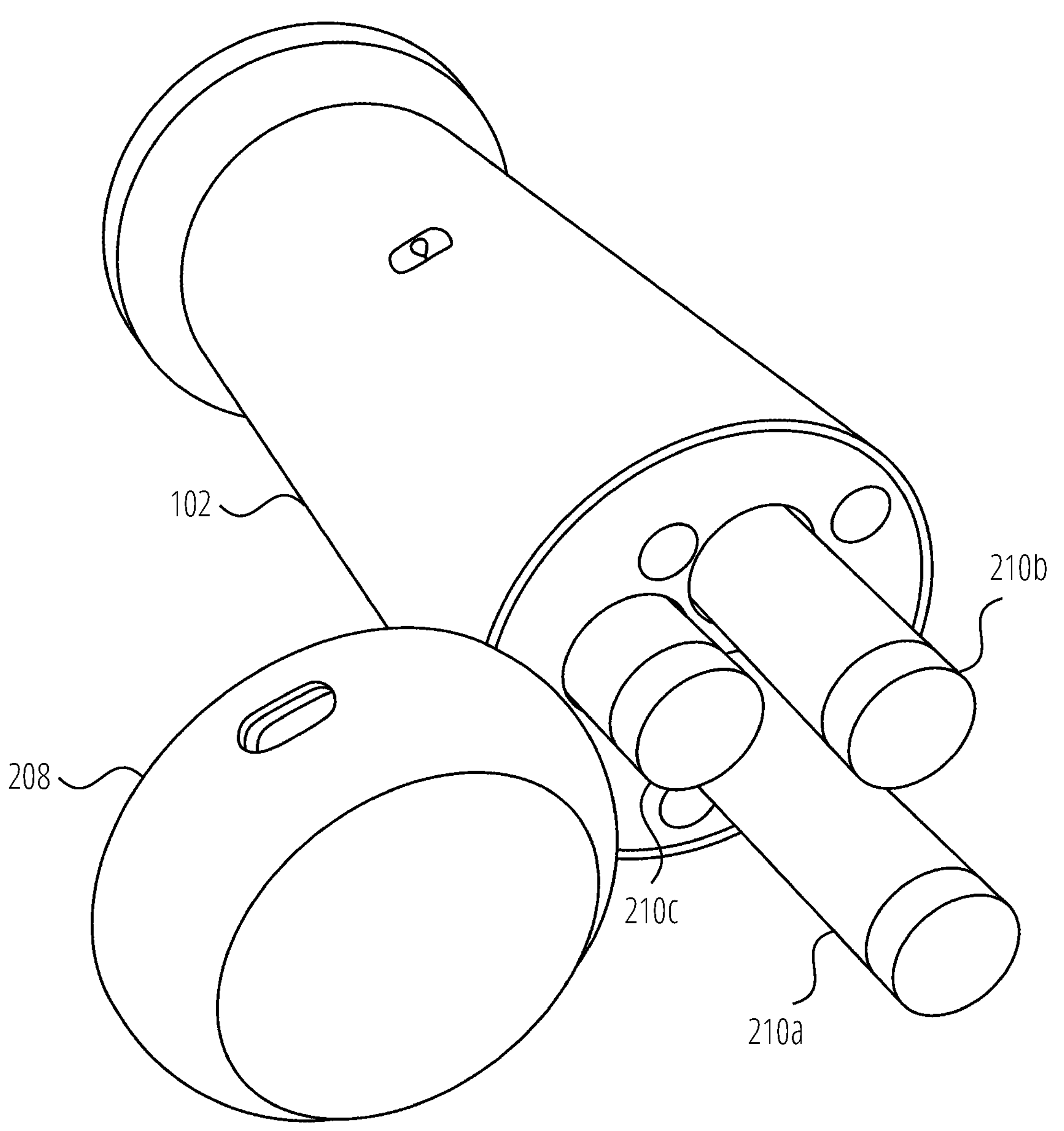

FIG. 2A and FIG. 2B illustrate a non-limiting example embodiment of a product mixing device according to various aspects of the present disclosure. The illustrated product mixing device 102 is a PERSO(TM) product mixing machine provided L'Oreal, but other product mixing devices that are capable of performing the actions described herein may be used as a product mixing device 102 in other embodiments of the present disclosure.

As shown in the front view of FIG. 2A, the product mixing device 102 includes a button 202. The product mixing device 102 receives an instruction from the color management computing system 104 to dispense color component products that, when mixed, provide a mixed product having the desired color. Upon receiving such an instruction and a press of the button 202, the product mixing device 102 dispenses the appropriate amounts of each color component product on a mixing surface 204. FIG. 2A shows dispensed color component products 206 on the mixing surface 204. In some embodiments, the user then uses a brush or other mixing implement to combine the dispensed color component products 206 on the mixing surface 204. In some embodiments, the user does not need to press the button 202, and instead the product mixing device 102 receives an instruction to dispense the color component products directly from the color management computing system 104.

FIG. 2B illustrates a bottom perspective view of the product mixing device 102 of FIG. 2A. In FIG. 2B, a cover 208 is shown in an open position, in which cartridges 210*a*-210*c* are visible in a partially inserted position. Each cartridge 210*a*-210*c* includes a color component product that has a predetermined color. The user may exchange one or more of the cartridges 210*a*-210*c* to change a spectrum of available colors that the product mixing device 102 can provide. In some embodiments, each cartridge 210*a*-210*c* includes a computer-readable identifier (e.g., an RFID tag, a serial number, a 2D- or 3D barcode; not illustrated) that can be read by a reader of the product mixing device 102 and/or the color management computing system 104, as will be described further below.

Figure 3:
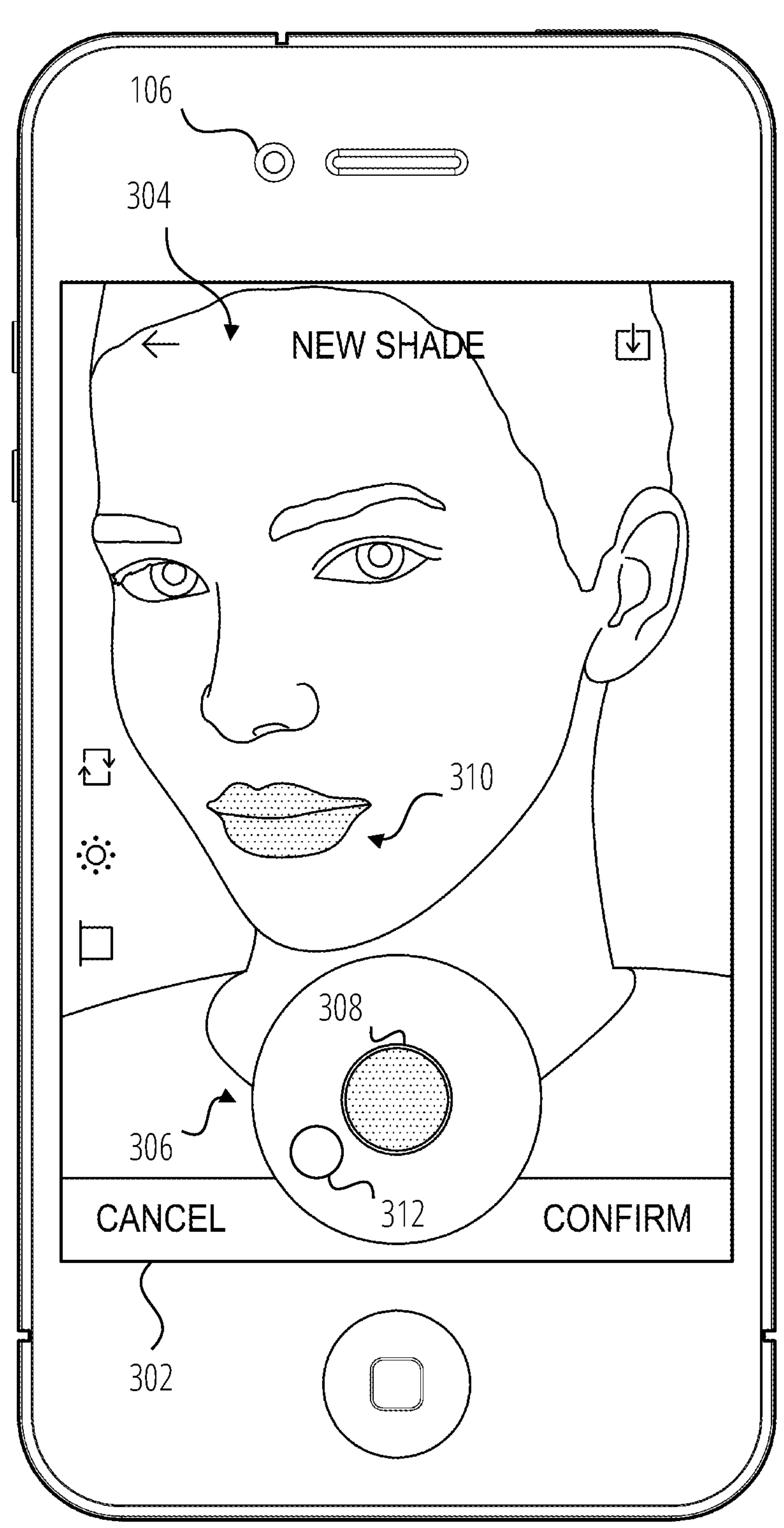
FIG. 3 illustrates a non-limiting example embodiment of an augmented reality interface according to various aspects of the present disclosure.

FIG. 3 illustrates a non-limiting example embodiment of an augmented reality interface according to various aspects of the present disclosure. As shown, the augmented reality interface 302 is presented by a display device of a computing device such as a smartphone, which also provides the camera 106. This embodiment should not be seen as limiting, and in other embodiments, the augmented reality interface 302 may be presented by a display device of a tablet computing device, a laptop computing device, a desktop computing device, or any other suitable type of computing device.

In the augmented reality interface 302, an image of the subject 304 as captured by the camera 106 is shown. The augmented reality interface 302 also includes a color selection component 306, on which a cursor 312 can be moved to select a color. In some embodiments, the color selection component 306 is configured to display colors that can be generated by the product mixing device 102 using the cartridges 210*a*-210*c* loaded therein ("available colors"). A color indicated by the current location of the cursor 312 is displayed in a color swatch 308 in the center of the color selection component 306.

The particular design of the color selection component 306 is an example only and should not be seen as limiting. In other embodiments, other types of color selection components may be used, including but not limited to a plurality of color swatches that each show a color capable of being generated using the product mixing device 102 and the cartridges 210*a*-210*c*. In some embodiments, the color selection component 306 may allow the subject 108 to point the camera 106 at an object of a color they wish to duplicate, and once an image of the object is captured by the camera 106, the color selection component 306 may determine a closest available color to the color of the object in the image (or at a particular point in the image).

In the augmented reality interface 302, a product rendering 310 is rendered over the image of the subject 304. The color of the product in the product rendering 310 corresponds to the color chosen in the color selection component 306 and displayed in the color swatch 308. Any suitable technique may be used to generate the product rendering 310, including but not limited to using generative models such as generative adversarial networks (GANs) or variational auto-encoders (VAEs); using computer graphics renderers with inverse graphics encoders; or any other suitable technique.

One aspect of generating the product rendering 310 is ensuring that the color presented in the color swatch 308 and by the product rendering 310 accurately represents the mixed product as it will be generated using the product mixing device 102. Accordingly, in some embodiments, the color management computing system 104 uses a display color correction profile to alter the colors of the color selection component 306, the color swatch 308, and the product rendering 310 in the augmented reality interface 302 to ensure that the colors match as expected. Further details of how the display color correction profile may be generated and used are provided below.

Figure 4:
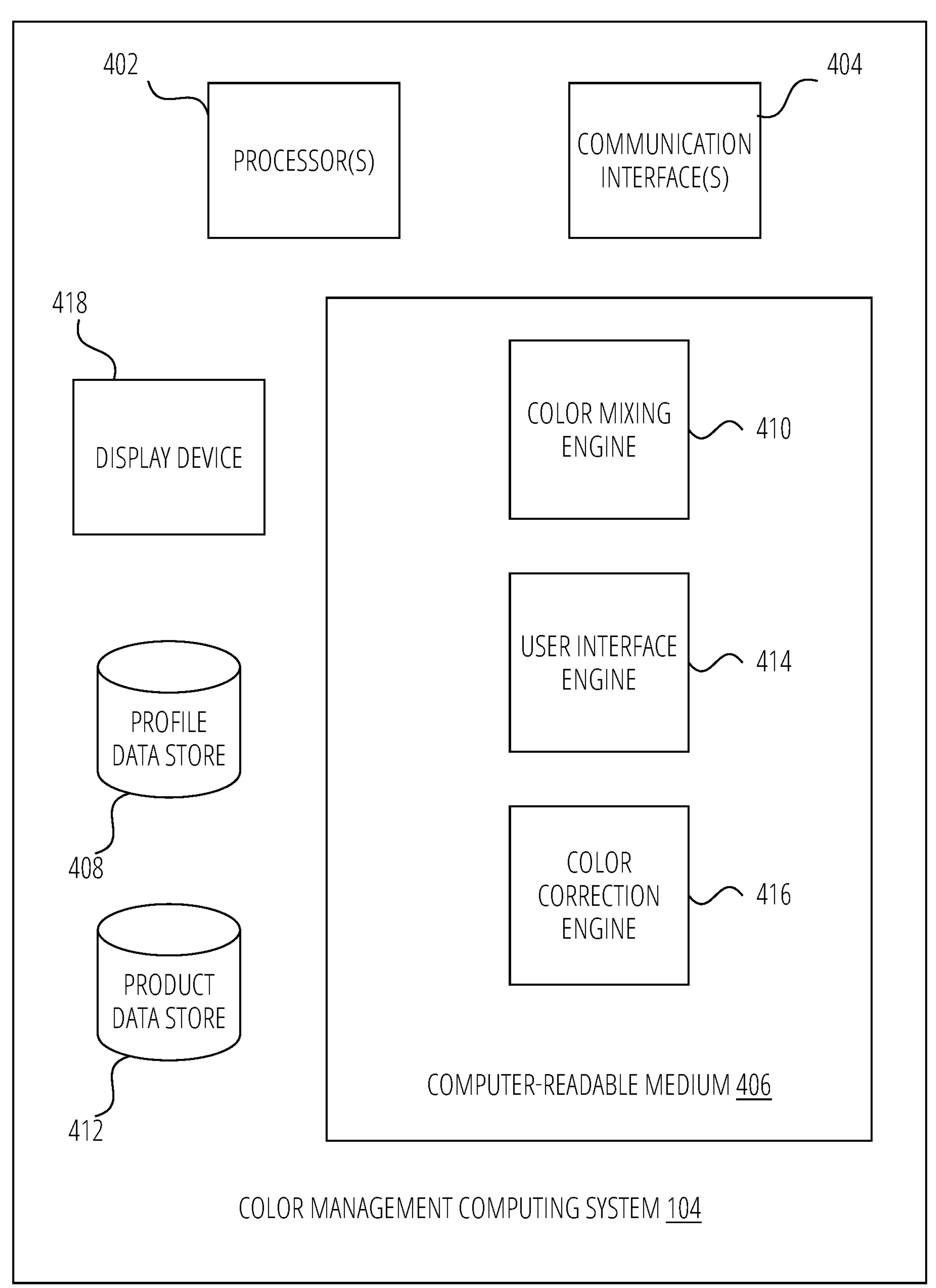
FIG. 4 is a block diagram that illustrates aspects of a non-limiting example embodiment of a color management computing system according to various aspects of the present disclosure.

FIG. 4 is a block diagram that illustrates aspects of a non-limiting example embodiment of a color management computing system according to various aspects of the present disclosure. The illustrated color management computing system 104 may be implemented by any computing device or collection of computing devices, including but not limited to a desktop computing device, a laptop computing device, a mobile computing device, a server computing device, a computing device of a cloud computing system, and/or combinations thereof. In some embodiments, the color management computing system 104 is configured to provide a color selection component to a subject for selecting a color for a mixed product, generate augmented reality interfaces to sample target colors, transmit instructions to product mixing devices to help generate mixed products, and/or to capture images of the mixed products. In some embodiments, the color management computing system 104 is also configured to update display color correction profiles based on the captured images in order to ensure that the colors presented in the color selection component and/or the augmented reality interfaces accurately represent the colors of the mixed products.

As shown, the color management computing system 104 includes one or more processors 402, one or more communication interfaces 404, a profile data store 408, a product data store 412, a display device 418, and a computer-readable medium 406.

In some embodiments, the processors 402 may include any suitable type of general-purpose computer processor. In some embodiments, the processors 402 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 404 include one or more hardware and or software interfaces suitable for providing communication links between components. The communication interfaces 404 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

In some embodiments, the display device 418 is configured to present user interfaces generated by the user interface engine 414, including but not limited to color selection components 306, augmented reality interfaces 302, and images captured by the camera 106. Though not illustrated in FIG. 4, the camera 106 may be incorporated into a device along with the display device 418 and other components of the color management computing system 104.

As shown, the computer-readable medium 406 has stored thereon logic that, in response to execution by the one or more processors 402, cause the color management computing system 104 to provide a color mixing engine 410, a user interface engine 414, and a color correction engine 416.

As used herein, “computer-readable medium” refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the color mixing engine 410 is configured to determine colors of mixed products that can be produced using two or more cartridges loaded in the product mixing device 102 based on identities of the cartridges and characteristics of color component products loaded in the identified cartridges as recorded in the product data store 412. In some embodiments, the user interface engine 414 is configured to generate various user interfaces, including but not limited to color selection components 306, augmented reality interfaces 302, and images captured by the camera 106. The user interface engine 414 is also configured to use display color correction profiles stored in the profile data store 408 to ensure accurate color reproductions in the user interfaces. In some embodiments, the color correction engine 416 is configured to create and update the display color correction profiles stored in the profile data store 408 based on captured images of mixed products.

Further description of the configuration of each of these components is provided below.

As used herein, “engine” refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 5:
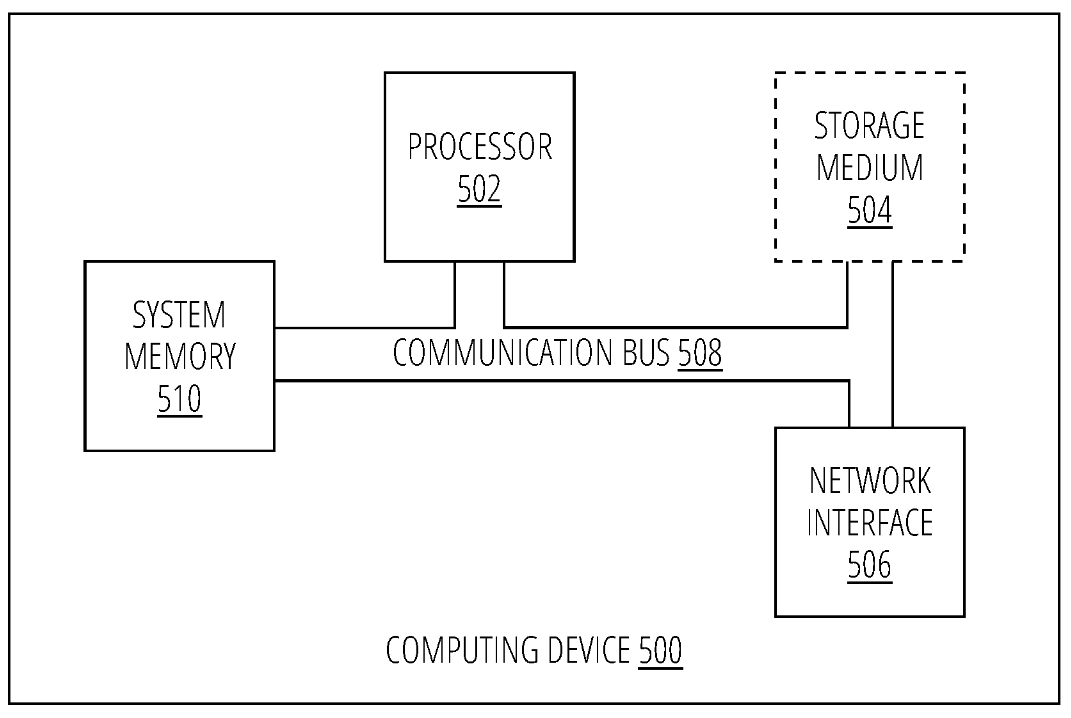
FIG. 5 is a block diagram that illustrates a non-limiting example embodiment of a computing device appropriate for use as a computing device with embodiments of the present disclosure.

FIG. 5 is a block diagram that illustrates aspects of an example computing device 500 appropriate for use as a computing device of the present disclosure. The computing device 500 is a non-limiting example of an embodiment of a computing device suitable for use as the color management computing system 104 described above (or a component thereof).

While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 500 may be any one of any number of currently available or yet to be developed devices.

In its most basic configuration, the computing device 500 includes at least one processor 502 and a system memory 510 connected by a communication bus 508. Depending on the exact configuration and type of device, the system memory 510 may be volatile or nonvolatile memory, such as read only memory ("ROM"), random access memory ("RAM"), EEPROM, flash memory, or similar memory technology. Those of ordinary skill in the art and others will recognize that system memory 510 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 506 comprising one or more components for communicating with other devices over a network. Embodiments of the present disclosure may access basic services that utilize the network interface 506 to perform communications using common network protocols. The network interface 506 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 506 illustrated in FIG. 5 may represent one or more wireless interfaces or physical communication interfaces described and illustrated above with respect to particular components of the computing device 500.

In the exemplary embodiment depicted in FIG. 5, the computing device 500 also includes a storage medium 504. However, services may be accessed using a computing device that does not include means for persisting data to a local storage medium. Therefore, the storage medium 504 depicted in FIG. 5 is represented with a dashed line to indicate that the storage medium 504 is optional. In any event, the storage medium 504 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 502, system memory 510, communication bus 508, storage medium 504, and network interface 506 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, Bluetooth low energy, USB, or other suitable connections protocols using wireless or physical connections. Similarly, the computing device 500 may also include output devices such as a display, speakers, printer, etc. Since these devices are well known in the art, they are not illustrated or described further herein.

Figure 6A:
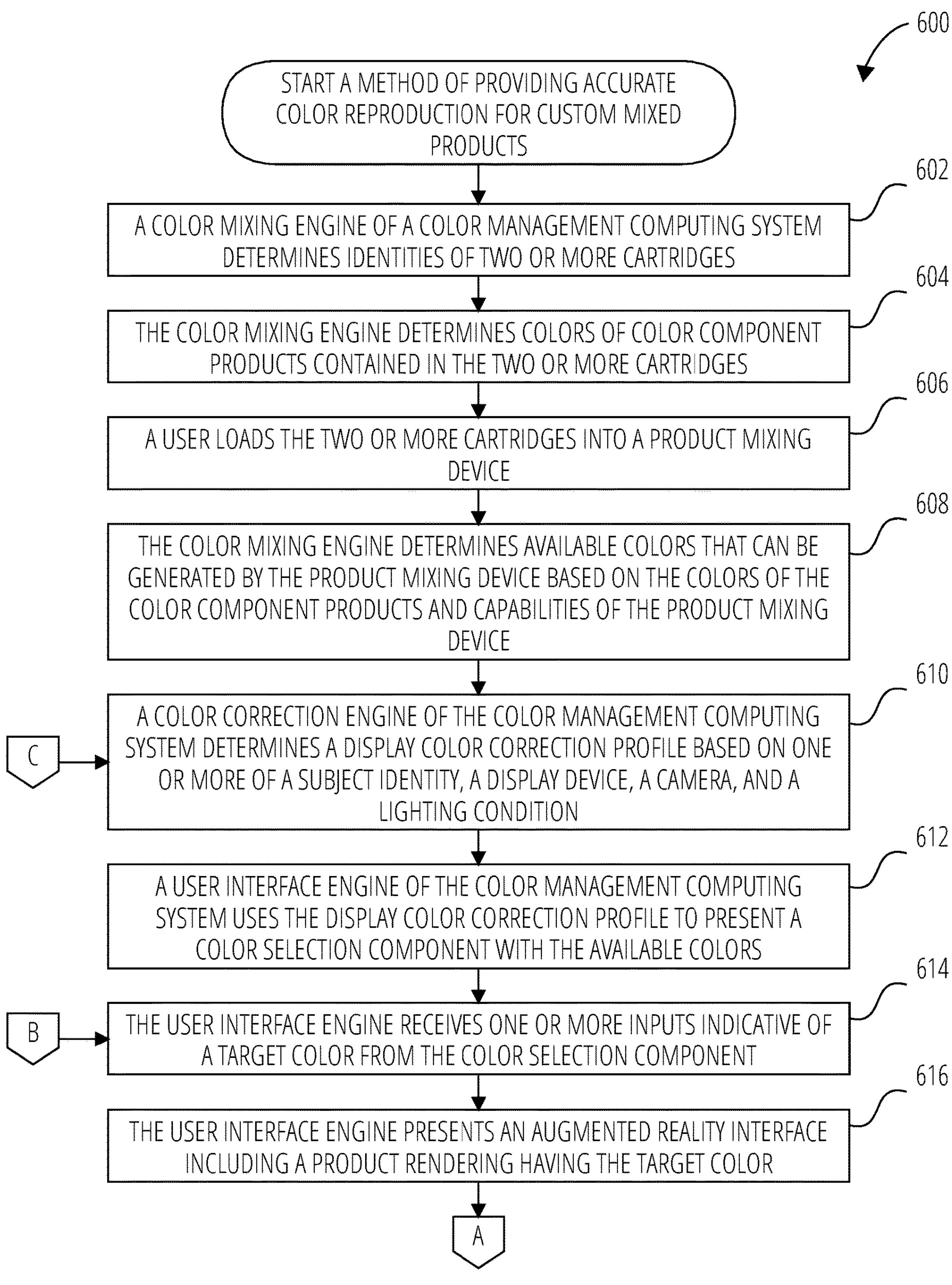

FIG. 6A-FIG. 6B are a flowchart that illustrates a non-limiting example embodiment of a method of providing an accurate color reproduction for custom mixed products according to various aspects of the present disclosure.

From a start block, the method 600 proceeds to block 602, where a color mixing engine 410 of a color management computing system 104 determines identities of two or more cartridges 210*a*-210*c*. In some embodiments, an RFID reader of the color management computing system 104 may interrogate an RFID tag of each cartridge 210*a*-210*c* to obtain a unique identifier of each cartridge 210*a*-210*c*. In some embodiments, the color management computing system 104 may use a camera (such as camera 106) to capture an image of a barcode on each cartridge 210*a*-210*c* that encodes a unique identifier of each cartridge 210*a*-210*c*. In some embodiments, the product mixing device 102 may obtain the unique identifier of each cartridge 210*a*-210*c*

(such as by interrogating an RFID tag of each cartridge 210a-210c or via wired communication with each installed cartridge 210a-210c), and the product mixing device 102 may transmit the unique identifiers to the color management computing system 104.

At block 604, the color mixing engine 410 determines colors of color component products contained in the two or more cartridges 210a-210c. In some embodiments, a record is stored in the product data store 412 for every cartridge (including but not limited to cartridges 210a-210c) that associates the unique identifier of the cartridge with a color of a color component product contained therein. In some embodiments, the color component product is manufactured to have a particular color, and the record stores the color that was intended for the color component product. In some embodiments, the exact colors of color component products as manufactured may vary from batch to batch, and the record may store both the intended color and a correction value associated with the batch of the color component product that is determined through measurement of the batch of the color component product after manufacturing. In some embodiments, the color stored in the record may be measured directly from the color component product after manufacturing. Accordingly, the color mixing engine 410 may determine the colors of the color component products contained in the two or more cartridges 210a-210c by retrieving the records associated with the two or more cartridges 210a-210c from the product data store 412 and obtaining the colors from the records. In some embodiments, the color mixing engine 410 may obtain the colors of the color component products directly using a color spectrophotometer. In some embodiments, the obtained color is a cyan-magenta-yellow (CMY) value, a cyan-magenta-yellow-black (CMYK) value, a red-green-blue (RGB) value, a CIELAB value, a hue-saturation-value (HSV) value, a hue-saturation-lightness (HSL) value, or a value in any other suitable color space or color model.

At block 606, a user loads the two or more cartridges 210a-210c into a product mixing device 102. As illustrated in FIG. 2B, the user may open a cover on the product mixing device 102 and insert the two or more cartridges 210a-210c into the product mixing device 102 for use.

At block 608, the color mixing engine 410 determines available colors that can be generated by the product mixing device 102 based on the colors of the color component products and capabilities of the product mixing device 102. In some embodiments, the product mixing device 102 provides its capabilities (e.g., minimum and/or maximum amounts of each color component product that the product mixing device 102 can dispense, minimum and/or maximum increments by which amounts of each color component product can be adjusted by the product mixing device 102) to the color mixing engine 410. In some embodiments, the color mixing engine 410 retrieves the capabilities of the product mixing device 102 from a server based on a model number, a unique identifier, or another identifier of the product mixing device 102. The color mixing engine 410 then determines the available colors by determining all of the colors that can be generated using the capabilities of the product mixing device 102 to dispense different amounts of the color component products. In some embodiments, the color mixing engine 410 may place a further bound on the available colors by eliminating colors that can be generated by the product mixing device 102 using the color component products but that lie outside of a gamut of the display device 418, or that cannot be distinguished from each other given a color depth of the display device 418.

At block 610, a color correction engine 416 of the color management computing system 104 determines a display color correction profile based on one or more of a subject identity, a display device, a camera, and a lighting condition. In some embodiments, one or more display color correction profiles may be stored in the profile data store 408, and the color correction engine 416 may retrieve an appropriate display color correction profile based on one or more of these parameters. In some embodiments, the color correction engine 416 may initialize a new display color correction profile that does not yet provide any correction values if no display color correction profiles have yet been stored in the profile data store 408.

At block 612, a user interface engine 414 of the color management computing system 104 uses the display color correction profile to present a color selection component 306 with the available colors as adjusted by the display color correction profile. In some embodiments, the color selection component 306 includes the color swatch 308, which is also presented as adjusted colors using the display color correction profile. The display color correction profile stores an offset to be applied to the available colors before presentation. For example, the display device 418 used to present the color selection component 306 may for manufacturing (or other) reasons generate images with slightly higher red values (in an RGB color space) than a reference display device, such that without correction, the display device 418 would present colors that look slightly more red than intended. In such an example, a display color correction profile trained during a previous iteration of the method 600 may provide an offset that reduces a red value (in the RGB color space) of the color to be presented so that the presented color appears accurate. As another example, the camera 106 used to capture images of the mixed products and to capture images for the virtual try-on may be slightly less responsive in a green value (in the RGB color space), such that images captured by the camera 106 appear slightly less green. In some embodiments, the color is stored as a CMY value, a CMYK value, an RGB value, a CIELAB value, an HSV value, an HSL value, or as a value in any other suitable color space or color model.

By compensating for these differences between available colors, adjusted colors presented by the display device 418, and colors detected by the camera 106 with a trained display color correction profile, colors presented for the color selection component 306, color swatch 308, and (as described later) the product rendering 310 can be adjusted to match the colors that will be captured by the camera 106, and a consistent user experience can be obtained—the subject 108 will be able to trust that colors that match in the virtual try-on will match when mixed and applied, and the subject 108 can avoid wasting product of undesirable colors.

At block 614, the user interface engine 414 receives one or more inputs indicative of a target color from the color selection component 306. As described above with respect to FIG. 3, the one or more inputs may include a selection received by a cursor 312 being placed over the target color using a touchscreen, a mouse, or any other suitable human interface device; by a tap, click, or other input being received on the target color; by the target color being captured by the camera 106, or via any other suitable technique.

At block 616, the user interface engine 414 presents an augmented reality interface 302 including a product rendering 310 having the target color. A non-limiting example of the augmented reality interface 302 was illustrated in FIG. 3 and described above. The target color received in block

614 is used to generate the product rendering 310 at block 616. In some embodiments, the display color correction profile is used while generating the product rendering 310. In some embodiments, an offset specified by the display color correction profile may be applied to the target color before the target color is provided to a rendering engine to generate the product rendering 310, such that the product rendering 310 is in an adjusted target color. In some embodiments, the offset specified by the display color correction profile may be applied instead to the product rendering 310 generated using the unaltered target color after the product rendering 310 is generated in order to generate the product rendering 310 in the adjusted target color. By using the display color correction profile while creating the product rendering 310, the product rendering 310 should match the adjusted target color as shown in the color swatch 308.

The method 600 then proceeds to a continuation terminal ("terminal A"). From terminal A (FIG. 6B), the method 600 advances to decision block 618, where a determination is made regarding whether the subject 108 finds the target color acceptable. This determination may be made based on whether a user interface element indicating acceptance has been actuated, whether a new target color was picked using the color selection component 306, or using any other suitable technique. If the determination is that the subject 108 did not find the target color acceptable, then the result of decision block 618 is NO, and the method 600 proceeds through a continuation terminal ("terminal B") back to block 614, where a new target color is selected.

Otherwise, if the determination is that the subject 108 did find the target color acceptable, then the result of decision block 618 is YES, and the method 600 advances to block 620. At block 620, the color mixing engine 410 transmits an instruction to the product mixing device 102 to dispense color component products that correspond to the target color to create a mixed product of a first color. In some embodiments, the color mixing engine 410 determines appropriate proportions or volumes of the color component products that, when mixed, will form a mixed product of a first color intended to accurately reproduce the target color, and transmits the proportions or volumes to the product mixing device 102 for dispensing. In some embodiments, the color mixing engine 410 transmits a representation of the target color itself to the product mixing device 102, and the product mixing device 102 determines the appropriate proportions or volumes of the color component products to be dispensed.

Once the color component products are dispensed onto the mixing surface 204 of the product mixing device 102, the color component products are manually mixed together to create the mixed product. Some or all of the mixed product may then be applied to the subject 108. For example, if the mixed product is lipstick, the subject 108 may mix together the color component products to create the mixed product lipstick, and may then apply the lipstick to their lips.

At block 622, the color correction engine 416 receives an image of the mixed product. In some embodiments, the subject 108 may be prompted to use the camera 106 to capture an image of the mixed product on the mixing surface 204 (or a standard test surface) before applying the mixed product to themselves, and this image of the mixed product may be provided to the color correction engine 416. In some embodiments, the subject 108 may capture a selfie or other image or video of themselves after having applied the mixed product, and this image or video that depicts the mixed product on the subject 108 may be provided to the color correction engine 416.

At block 624, the color correction engine 416 computes a difference between a captured color of the mixed product in the image and the target color. In some embodiments, the color correction engine 416 may use an appropriate facial feature recognition technique, which include but are not limited to convolutional neural networks, to segment the image and detect a portion of a face to which the mixed product was intended to be applied. For example, if the mixed product is lipstick, the color correction engine 416 may segment the image using a convolutional neural network to find a portion of the image that depicts the lips of the subject 108. The color correction engine 416 may then measure a captured color in the identified segment of the image. In some embodiments, the color correction engine 416 may measure a captured color at a single point in the segment of the image. In some embodiments, the color correction engine 416 may average captured colors at multiple points in the segment of the image (or the entire segment of the image). In some embodiments, the color correction engine 416 may discard portions of the segment of the image (or of the image as a whole) that include captured colors that are farther away from the target color than a predetermined threshold in order to detect the mixed product in the image, and may perform its color measurement on the remaining captured colors.

The difference between the captured color of the mixed product in the image and the target color may be determined using any suitable technique. In some embodiments, the captured color and/or the target color may be converted into a matching color space and/or color model, and a simple difference between the two values may be determined. For example, if the captured color of the mixed product in the image is a pink that is measured and converted to the RGB color space (if necessary) as rgb (255, 171, 158), and the target color is a pink chosen from the color selection component 306 and converted to the RGB color space (if necessary) as rgb (255, 155, 148), then the difference between the captured color and the target color would be rgb (0, 16, 10).

At block 626, the color correction engine 416 updates the display color correction profile based on the computed difference. In some embodiments, the computed difference may be directly used as an offset to be applied within the display color correction profile (e.g., in the example above where the selected difference was rgb (0, 16, 10), the value rgb (0, 16, 10) would be used as the offset). In some embodiments, the computed difference may be used to update the offset value in a direction that reduces the error. For example, a feedback loop controller may be used in which the captured color is a process value, the target color is a set point value, and the offset of the display color correction profile is a control value. The computed difference between the captured color and the target color can be used to update the offset within the feedback control loop using any suitable feedback control loop technique, including but not limited to proportional-derivative-integral (PID) controller techniques.

In some embodiments, once the display color correction profile is updated, the user interface engine 414 may immediately apply the updated display color correction profile to the augmented reality interface 302. In some embodiments, the color correction engine 416 may store the updated display color correction profile in the profile data store 408 for a subsequent iteration or execution of the method 600.

The method 600 then proceeds to decision block 628, where a determination is made regarding whether a new color should be processed. This determination may be based on the subject 108 restarting or resetting the user interface, by detecting actuation of a user interface element that indicates a desire for a new target color, by power cycling or otherwise resetting or interacting with the product mixing device 102, or any other suitable technique. If it is determined that a new target color should be obtained, then the result of decision block 628 is YES, and the method 600 advances through a continuation terminal ("terminal C") to return to block 610 to process the next color. Otherwise, if it is determined that a new color should not be processed, then the result of decision block 628 is NO, and the method 600 proceeds to an end block and terminates.

Updating the display color correction profile based on the comparison of the captured color to the target color provides technical advantages, including but not limited to improving the quality of the augmented reality interface 302 and reducing the computing resources required to generate the augmented reality interface 302 with a high quality. In the system 100, it is desirable for the product rendering 310 to match a selfie taken with the camera 106 and presented by the display device 418 so that colors can accurately be matched and evaluated within the selfie view within the augmented reality interface 302. Further, if the augmented reality interface 302 includes a side-by-side mode in which the product rendering 310 could be viewed alongside the selfie of the subject 108 after having applied the mixed product, the captured image of the mixed product as applied should look as similar as possible to the product rendering 310 to prove that the augmented reality interface 302 is providing a realistic rendering.

Complicated techniques for compensating separately for lighting conditions, exposure, display characteristics, camera characteristics, operating idiosyncrasies of the product mixing device 102, and other confounding factors could theoretically be used to provide a realistic rendering. However, the effect of each of these confounding factors would have to be isolated and techniques for compensating for each would have to be developed. Such separate techniques would greatly increase the amount of computing power necessary to generate the augmented reality interface 302. Alternatively, the effect of the confounding factors could be reduced by using standardized lighting conditions, display devices, cameras, and so on. However, it is desirable for the augmented reality interface 302 to be able to be generated by consumer-level computing devices in a variety of operating conditions, and so using standardized equipment is simply not feasible.

In contrast, by comparing the captured color to the target color in order to determine the offset to be used in the display color correction profile, all of the confounding factors within the system 100-including but not limited to lighting conditions, exposure, display characteristics, camera characteristics, characteristics of the product mixing device 102, and even confounding factors that have not yet been identified—can be compensated for as a group with a single value. This single comparison of color values is remarkably efficient and does not require deep understanding of the confounding factors to be effective.

One of ordinary skill in the art will recognize that while the method 600 is illustrated with blocks in a particular order, this order should not be seen as limiting, and that in some embodiments, one or more of the blocks may be performed in a different order, in parallel, and/or more than once for a given iteration of the method 600. As one example, the cartridges being loaded into the product mixing device 102 (block 606) may occur at any point before the product mixing device 102 dispenses the color component products, and may even occur before the identities of the cartridges are determined (block 602) if the product mixing device 102 interrogates the cartridges to determine their identities.

While illustrative embodiments have been illustrated and described, it will be appreciated that various changes can be made therein without departing from the spirit and scope of the invention.

The invention claimed is:

1. A computer-implemented method of accurately reproducing a color of a mixed product, the method comprising:

receiving, by a color management computing system, one or more inputs indicative of a target color;

transmitting, by the color management computing system, a command to a product mixing device to dispense color component products to be mixed to create a mixed product of a first color;

obtaining, by the color management computing system, an image that includes the mixed product;

updating, by the color management computing system, a display color correction profile based on a comparison of a captured color of the mixed product in the image to the target color; and presenting, by the color management computing system, one or more instances on a display device of an adjusted target color indicative of the updated display color correction profile, in response to receiving a subsequent request to change the target color.

2. The computer-implemented method of claim 1, further comprising repeating the actions of obtaining images that include mixed products and updating the display color correction profile based on comparisons of captured colors of the mixed products in the images to target colors corresponding to the mixed products two or more times.

3. The computer-implemented method of claim 2, wherein updating the display color correction profile uses a feedback control loop wherein the captured color is a process value, the target color is a set point, and the display color correction profile is a control value.

4. The computer-implemented method of claim 3, wherein the feedback control loop is a proportional-integral-derivative (PID) control loop.

5. The computer-implemented method of claim 1, wherein presenting one or more instances on the display device of the adjusted target color indicative of the updated display color correction profile includes at least one of:

using the display color correction profile to adjust a display color of a color swatch in a color selection component; and using the display color correction profile to adjust a display color of a product rendering in an augmented reality presentation.

6. The computer-implemented method of claim 1, wherein the image that includes the mixed product is an image of a subject after applying the mixed product.

7. The computer-implemented method of claim 1, wherein the image that includes the mixed product is an image of the mixed product on a test surface or on a mixing surface of the product mixing device.

8. A system comprising:

a product mixing device;

a camera; and a color management computing system communicatively coupled to the product mixing device and the camera, wherein the color management computing system includes:

circuitry for receiving one or more inputs indicative of a target color;

circuitry for transmitting a command to the product mixing device to dispense color component products to be mixed to create a mixed product of a first color;

circuitry for obtaining, from the camera, an image that includes the mixed product;

circuitry for updating a display color correction profile based on a comparison of a captured color of the mixed product in the image to the target color; and circuitry for presenting one or more instances on a display device of an adjusted target color indicative of the updated display color correction profile, in response to receiving a subsequent request to change the target color.

9. The system of claim 8, wherein the color management computing system further includes circuitry for repeating the actions of obtaining images that include mixed products and updating the display color correction profile based on comparisons of captured colors of the mixed products in the images to target colors corresponding to the mixed products two or more times.

10. The system of claim 9, wherein updating the display color correction profile uses a feedback control loop wherein the captured color is a process value, the target color is a set point, and the display color correction profile is a control value.

11. The system of claim 10, wherein the feedback control loop is a proportional-integral-derivative (PID) control loop.

12. The system of claim 8, wherein presenting one or more instances on the display device of the adjusted target color indicative of the updated display color correction profile includes at least one of:

using the display color correction profile to adjust a display color of a color swatch in a color selection component; and using the display color correction profile to adjust a display color of a product rendering in an augmented reality presentation.

13. The system of claim 8, wherein the image that includes the mixed product is an image of a subject after applying the mixed product, an image of the mixed product on a test surface, or an image of the mixed product on a mixing surface of the product mixing device.

14. A non-transitory computer-readable medium having computer-executed instructions stored thereon that, in response to execution by one or more processors of a color management computing system, cause the color management computing system to perform actions for accurately reproducing a color of a mixed product, the actions comprising:

receiving, by the color management computing system, one or more inputs indicative of a target color;

transmitting, by the color management computing system, a command to a product mixing device to dispense color component products to be mixed to create a mixed product of a first color;

obtaining, by the color management computing system, an image that includes the mixed product;

updating, by the color management computing system, a display color correction profile based on a comparison of a captured color of the mixed product in the image to the target color; and presenting, by the color management computing system, one or more instances on a display device of an adjusted target color indicative of the updated display color correction profile, in response to receiving a subsequent request to change the target color.

15. The non-transitory computer-readable medium of claim 14, wherein the actions further comprise repeating the actions of obtaining images that include mixed products and updating the display color correction profile based on comparisons of captured colors of the mixed products in the images to target colors corresponding to the mixed products two or more times.

16. The non-transitory computer-readable medium of claim 15, wherein updating the display color correction profile uses a feedback control loop wherein the captured color is a process value, the target color is a set point, and the display color correction profile is a control value.

17. The non-transitory computer-readable medium of claim 16, wherein the feedback control loop is a proportional-integral-derivative (PID) control loop.

18. The non-transitory computer-readable medium of claim 14, wherein presenting one or more instances on the display device of the adjusted target color indicative of the updated display color correction profile includes at least one of:

using the display color correction profile to adjust a display color of a color swatch in a color selection component; and using the display color correction profile to adjust a display color of a product rendering in an augmented reality presentation.

19. The non-transitory computer-readable medium of claim 14, wherein the image that includes the mixed product is an image of a subject after applying the mixed product.

20. The computer-implemented method of claim 14, wherein the image that includes the mixed product is an image of the mixed product on a test surface or on a mixing surface of the product mixing device.

* * * * *